No. 661,594. Patented Nov. 13, 1900.
R. L. YOUNG.
VEHICLE.
(Application filed Mar. 27, 1900.)

(No Model.)

Witnesses.
C. N. Keeney.
Anna V. Faust.

Inventor.
Richard L. Young
By Benedict and Morsell
Attorneys.

THE NORRIS PETERS CO., PHOTO-LITHO., WASHINGTON, D. C.

UNITED STATES PATENT OFFICE.

RICHARD L. YOUNG, OF MILWAUKEE, WISCONSIN, ASSIGNOR OF ONE-HALF TO THOMAS J. PRICE, OF SAME PLACE.

VEHICLE.

SPECIFICATION forming part of Letters Patent No. 661,594, dated November 13, 1900.

Application filed March 27, 1900. Serial No. 10,326. (No model.)

*To all whom it may concern:*

Be it known that I, RICHARD L. YOUNG, of Milwaukee, in the county of Milwaukee and State of Wisconsin, have invented a new and useful Improvement in Vehicles, of which the following is a description, reference being had to the accompanying drawings, which are a part of this specification.

My invention has relation to improvements in vehicles, more particularly to that type of vehicles known as "horseless" vehicles.

The primary object resides in providing for an improved form of turning and steering mechanism, whereby certain advantageous results are obtained, as hereinafter more fully set forth.

With the above primary object in view the invention consists of the devices and parts or their equivalents, as hereinafter set forth.

Figure 1:
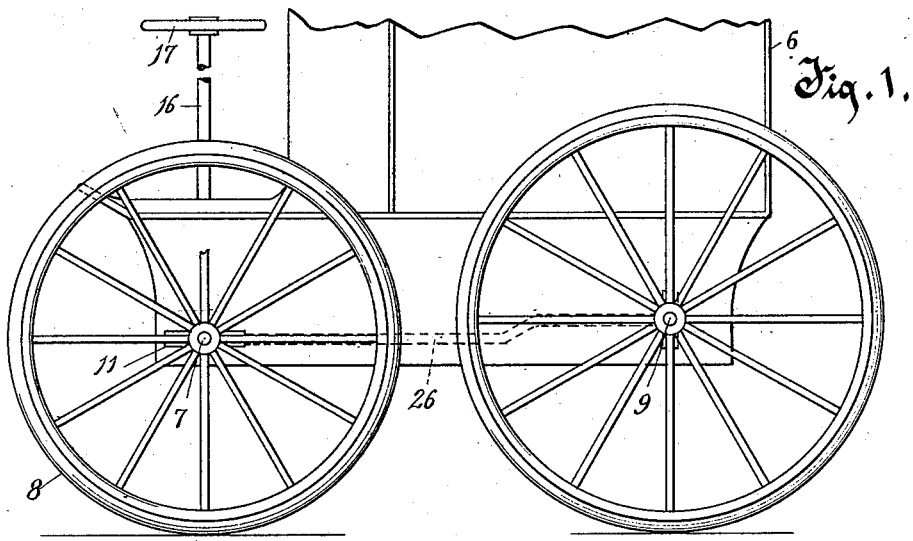
Figure 2:
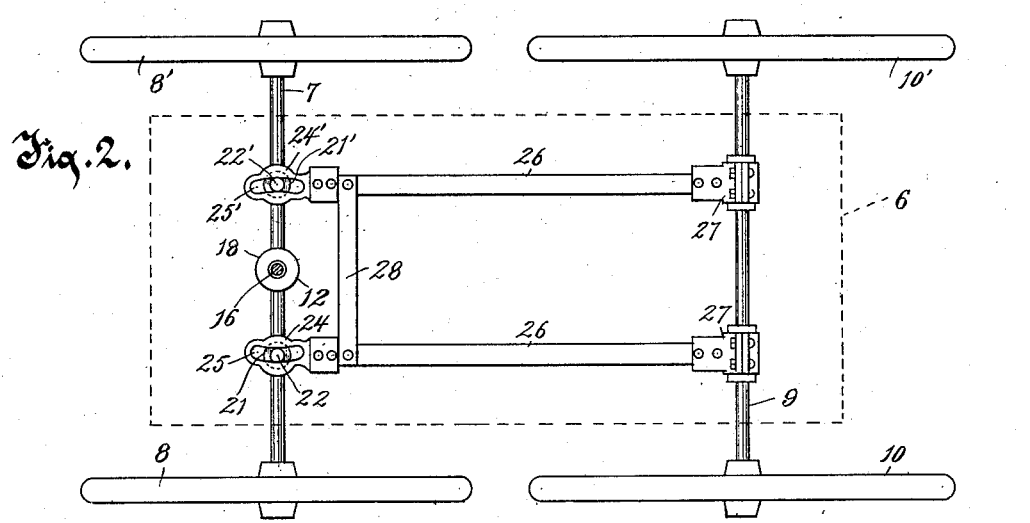
Figure 3:
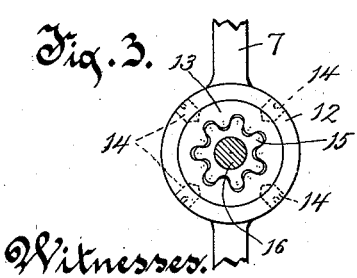
Figure 4:
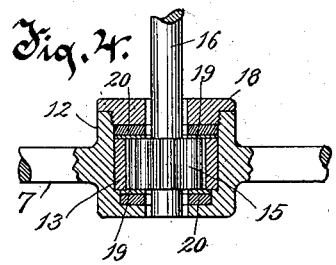
Figure 5:
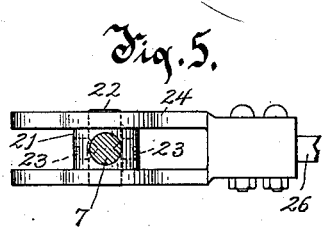

In the accompanying drawings, Figure 1 is a side elevation of a vehicle equipped with my improvements. Fig. 2 is a plan view of Fig. 1, the body of the vehicle being shown in dotted lines. Fig. 3 is a detail plan view of the central steering mechanism. Fig. 4 is a vertical section of Fig. 3, and Fig. 5 is a horizontal section through the front axle and looking toward the boss 21.

Referring to the drawings, the numeral 6 indicates the body of the vehicle, which may be of any approved form of construction.

The numeral 7 indicates the front axle, having the front traction-wheels 8 8' mounted thereon, and 9 the rear axle, having the rear traction-wheels 10 10' mounted thereon. These axles are journaled in suitable bearings in the body of the vehicle, and the front axle passes through horizontally-elongated slots 11 in the depending side pieces of said body of the vehicle. At its center the front axle is formed or provided with a hub portion 12, and this hub is formed or provided with an internal gear-wheel 13. This gear-wheel is preferably separate from the hub and is securely fastened therein by means of setscrews 14. Adapted to engage the teeth of the gear-wheel 13 is a spur-wheel 15, said spur-wheel carried by a steering-rod 16, which rod is extended upwardly in convenient position to be reached by the occupant of the vehicle. The upper end of the rod carries a hand-wheel 17 for convenience in turning the same. The lower end of the steering-rod is preferably extended a slight distance below the spur-wheel and is seated in the bottom of the hub. The top of the hub is closed by means of a screw-cap 18, having a central opening through which the steering-rod passes. Bearing against the upper and lower faces of the spur-wheel are plates 19 19, against which said spur-wheel is adapted to work. These plates are preferably of steel. Cushions 20 20, preferably of rubber, are adjacent to the plates 19, one of said cushions being disposed between one of said plates and the cap 18 and the other cushion between the other of said plates and the bottom of the hub. These cushions are adapted to take up side motion or jarring which may be occasioned by unevenness in the road-bed.

The front axle is formed or provided with bosses arranged, respectively, at intermediate points between the central steering mechanism and the respective traction-wheels 8 8'. The boss nearest the wheel 8 is indicated by the numeral 21 and the boss nearest the wheel 8' by the numeral 21'. These bosses are intersected, respectively, by vertical studs 22 22'. Extending into the bosses from diametrically opposite sides thereof are conical pins 23, the points of said pins engaging the respective studs 22, and thereby serving to hold said studs in the openings of the bosses. Straddling the respective bosses, so as to bear against the upper and lower ends thereof, are forks 24 24'. The two members of each fork are provided with curved segmental slots, the concentric slots of the arms of fork 24 being indicated by the numeral 25 and the concentric slots of the arm of fork 24' being indicated by the numeral 25'. The slots 25 curve outwardly toward the wheel 8, and the slots 25' curve outwardly toward the wheel 8'. The slots 25 receive the projecting ends of the stud 22, and the slots 25' receive the projecting ends of the stud 22'. The forks have extending rearwardly therefrom parallel longitudinal arms 26 26, which arms at their rear ends are provided with bearings 27 27 for the rear axle. These arms therefore bind the front and rear axles. The said arms are preferably braced by means of a cross-strap 28.

In the operation of my invention if it is desired to turn a corner and the turning is in a direction to throw the wheel 8 around the hand-wheel 17 is grasped and turned in a proper direction to cause the spur-wheel 15 to rotate and by its engagement with the gear-wheel 13 to turn the front axle in the desired direction. With this turning of said axle the studs 22 22' move in the arcs of the circles formed by the slots 25 25', traveling the full length of the throw either way, and the contact of the studs with the ends of these slots limits the extent of the turning. By reason of the fact that the front axle passes through the elongated slots 11 in the body of the vehicle the swinging around of the axle in the manner described is of course not interfered with. Whenever it is desired to turn the vehicle in an opposite direction to that described, of course the steering-wheel 17 is given a reverse turn.

It will be seen that by my improvement the necessity of a fifth-wheel is entirely obviated. Furthermore, by the particular arrangement of the hub 12 sufficient room is left in said hub to permit of any side motion which may be occasioned by rough road-beds, the jar being taken up by the cushions 20. There is also ample room left in the hub 12 to provide for sufficient clearance to prevent the gears from locking. Still further, in turning the front axle from right to left, or vice versa, the pressure is equally divided.

While I prefer to provide the forward ends of the arms 26 with the forks and the members of each fork with concentric slots, yet I do not wish to be understood as limiting myself thereto, inasmuch as the fork formation is not absolutely necessary in order to secure successful results, as each arm 26 could be provided at its forward end with merely a single arm or extension having a curved slot therein without departing from the spirit and scope of my invention. In such arrangement the pin 22 or 22', as the case may be, should be extended a slight distance beyond the slot and a transverse pin or colter-pin made to intersect the end of said pin 22 or 22' in order to hold the slotted arm to the axle.

What I claim as my invention is—

1. In a vehicle, the combination of front and rear axles, traction-wheels mounted thereon, studs intersecting the front axle vertically, forks straddling the front axle, the arms of each fork provided with concentric curved slots to receive the projecting ends of each stud, and arms extending from the forks and provided at their rear ends with bearings for the rear axle.

2. In a vehicle, the combination of front and rear axles, the front axle formed or provided with bosses or enlargements, studs intersecting the bosses vertically, traction-wheels mounted on the front and rear axles, and arms provided at their rear ends with bearings for the rear axle, and each arm provided at its forward end with a forward extension, each extension being adjacent to the end of a boss, and provided with a curved slot to receive the vertical pin.

3. In a vehicle, the combination of front and rear axles, the front axle having at a medial point a chambered hub portion, traction-wheels mounted on the front and rear axles, a rotatable part extending into the chamber of the hub and engaging the walls of said chamber, and thereby adapted to swing the axle, and means for turning the rotatable part.

4. In a vehicle, the combination of front and rear axles, the front axle having at a medial point a chambered hub portion, the walls of the chamber being provided interiorly with a rigid gear-wheel, traction-wheels mounted on the front and rear axles, a toothed wheel arranged within the chamber of the hub and engaging the gear-wheel thereof, and thereby adapted to swing the axle, and means for turning said toothed wheel.

5. In a vehicle, the combination of front and rear axles, the front axle having a medial hub portion, traction-wheels mounted on the front and rear axles, a rotatable part engaging the hub and thereby adapted to swing the axle, means for turning said rotatable part, studs intersecting the front axle vertically, each stud being disposed between the hub portion and the outer ends of the axle, and arms provided with bearings for the rear axle, and each arm provided at its forward end with a forward extension extending over the front axle, each extension provided with a curved slot adapted to receive the vertical pin.

6. In a vehicle, the combination of front and rear axles, the front axle having a medial hub portion, traction-wheels mounted on the front and rear axles, a rotatable part arranged within and engaging the hub, and thereby adapted to swing the axle, plates interposed between the rotatable part and the ends of the hub, and means for turning the rotatable part.

7. In a vehicle, the combination of front and rear axles, the front axle having a medial hub portion, said hub having a closed lower end, a screw-cap fitting the upper end of the hub, traction-wheels mounted on the front and rear axles, a rotatable part engaging the hub, and thereby adapted to swing the axle, and means for turning said rotatable part.

8. In a vehicle, the combination of front and rear axles, the front axle having a medial hub portion, traction-wheels mounted on the front and rear axles, a rotatable part arranged within and engaging the hub, and thereby adapted to swing the axle, cushions interposed between the rotatable part and the ends of the hub, and means for turning said rotatable part.

9. In a vehicle, the combination of front and rear axles, traction-wheels mounted thereon, studs intersecting the front axle vertically, and arms provided at their rear ends with bearings for the rear axle, and each arm provided at its forward end with a forward extension extending over the front axle, each extension provided with a curved slot adapted to receive the vertical pin.

In testimony whereof I affix my signature in presence of two witnesses.

RICHARD L. YOUNG.

Witnesses:
EDWARD CRAMER,
COURT B. CUNLEY.